US012083651B2

(12) United States Patent
Blumenthal et al.

(10) Patent No.: US 12,083,651 B2
(45) Date of Patent: Sep. 10, 2024

(54) RATCHET MECHANISM FOR TOOL

(71) Applicant: Milwaukee Electric Tool Corporation, Brookfield, WI (US)

(72) Inventors: Aaron S. Blumenthal, Wauwatosa, WI (US); Christopher S. Hoppe, Cedarburg, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 530 days.

(21) Appl. No.: 16/896,772

(22) Filed: Jun. 9, 2020

(65) Prior Publication Data

US 2020/0298379 A1 Sep. 24, 2020

Related U.S. Application Data

(63) Continuation of application No. 15/709,131, filed on Sep. 19, 2017, now Pat. No. 10,688,631.

(60) Provisional application No. 62/397,247, filed on Sep. 20, 2016.

(51) Int. Cl.
*B25B 13/46* (2006.01)
*B25B 23/00* (2006.01)

(52) U.S. Cl.
CPC .......... *B25B 13/463* (2013.01); *B25B 13/465* (2013.01); *B25B 23/0007* (2013.01)

(58) Field of Classification Search
CPC ..... B25B 13/10; B25B 13/462; B25B 13/463; B25B 13/46; B25B 13/48; B25B 13/465; B25B 13/466; B25B 13/481; B25B 13/5091; B25B 17/00; B25B 21/00; B25B 21/004; B25B 21/005; B25B 23/0007; B25B 23/0035; B25B 23/1425; B25B 23/1427; B25B 23/1456; B25B 23/141; B25B 23/14; B25B 23/16; B25B 23/142; B25B 23/147; B25B 15/04; B25G 1/00; B25G 1/005; E21B 19/16; F16D 7/04; F16D 7/042; F16D 7/048; F16D 11/04; F16D 11/10; F16D 41/12; F16D 43/14; F16D 43/16
See application file for complete search history.

(56) References Cited

U.S. PATENT DOCUMENTS 3,486,597 A * 12/1969 Carlton .................. F16D 41/12 192/46
3,667,307 A * 6/1972 Kelch .................. F16D 41/18 968/83
5,020,648 A * 6/1991 Bush .................. F16D 7/048 192/64

(Continued)

FOREIGN PATENT DOCUMENTS

CN 1262640 A 8/2000
CN 1370659 A 9/2002

(Continued)

*Primary Examiner* — Robert J Scruggs
(74) *Attorney, Agent, or Firm* — Reinhart Boerner Van Deuren s.c.

(57) ABSTRACT

A ratcheting tool is provided. The ratcheting tool includes a ratchet mechanism including a gear structure and a pawl structure. The pawl structure includes at least one elastic or integral component that provides spring action/biasing to the pawl teeth which facilitates ratcheting movement.

20 Claims, 7 Drawing Sheets

(56) References Cited

U.S. PATENT DOCUMENTS

| | | | | |
|---|---|---|---|---|
| 5,174,176 | A * | 12/1992 | Krivec .................. | B25B 13/463 81/62 |
| 5,568,751 | A | 10/1996 | Lee | |
| 5,636,557 | A | 6/1997 | Ma | |
| 5,873,286 | A * | 2/1999 | Van Lenten .......... | B25B 13/463 74/577 M |
| 6,148,979 | A * | 11/2000 | Roach ..................... | F16D 43/16 74/577 M |
| 6,467,378 | B1 | 10/2002 | Chen | |
| 6,539,825 | B1 | 4/2003 | Lin | |
| 7,044,029 | B1 | 5/2006 | Hopper, Jr. et al. | |
| 7,100,477 | B2 | 9/2006 | Lee | |
| 7,178,429 | B2 | 2/2007 | Lin | |
| 7,448,481 | B2 * | 11/2008 | Kimes ..................... | F16D 41/12 192/103 B |
| 8,051,747 | B1 | 11/2011 | Tsai | |
| 8,104,381 | B1 | 1/2012 | Chen | |
| 8,337,077 | B2 * | 12/2012 | Giacobino ........... | G04B 11/006 368/147 |
| 8,943,928 | B2 | 2/2015 | Feng | |
| 9,067,308 | B2 | 6/2015 | Lai | |
| 9,140,317 | B2 * | 9/2015 | Buchanan ............. | B25B 13/463 |
| 2003/0005795 | A1 | 1/2003 | Mccann | |
| 2003/0079572 | A1 | 5/2003 | Ho | |
| 2004/0083860 | A1 | 5/2004 | Arnold | |
| 2005/0011315 | A1 * | 1/2005 | Chen ..................... | B25B 13/463 81/63.1 |
| 2006/0090606 | A1 | 5/2006 | Spirer | |
| 2008/0257117 | A1 | 10/2008 | Yang | |
| 2013/0152742 | A1 | 6/2013 | Chen | |
| 2013/0174697 | A1 * | 7/2013 | Hsieh ...................... | B23P 15/00 81/60 |
| 2013/0255060 | A1 * | 10/2013 | Johnson .................. | B25B 13/08 29/456 |
| 2014/0196577 | A1 | 7/2014 | Chen | |
| 2015/0135908 | A1 * | 5/2015 | Solar ......................... | F16F 1/26 81/60 |
| 2015/0196994 | A1 | 7/2015 | Huang | |
| 2015/0290779 | A1 | 10/2015 | Lai | |
| 2015/0314425 | A1 | 11/2015 | Mingarelli | |

FOREIGN PATENT DOCUMENTS

| | | | | |
|---|---|---|---|---|
| CN | 200974205 | Y | | 11/2007 |
| CN | 201342652 | Y | | 11/2009 |
| CN | 201342653 | Y | | 11/2009 |
| CN | 201799968 | U | | 4/2011 |
| CN | 202344447 | U | | 7/2012 |
| CN | 204868675 | U | | 12/2015 |
| CN | 103286716 | B | | 9/2016 |
| DE | 4320253 | | | 12/1994 |
| DE | 9321204 | | | 7/1996 |
| DE | 20105231 | | | 6/2001 |
| DE | 20110868 | | | 9/2001 |
| DE | 20200363 | | | 4/2002 |
| DE | 202012104590 | | | 3/2013 |
| DE | 102014112878 | | | 3/2016 |
| EP | 810068 | B1 | | 2/2000 |
| EP | 994765 | A1 | | 4/2000 |
| EP | 2633952 | A2 | | 9/2013 |
| TW | M444911 | | | 1/2013 |
| TW | 201350277 | | | 12/2013 |
| TW | I453095 | | | 9/2014 |
| WO | WO 8702107 | | * | 4/1987 |
| WO | WO9856539 | A1 | | 12/1998 |
| WO | WO2008128395 | A1 | | 10/2008 |

* cited by examiner

RATCHET MECHANISM FOR TOOL

CROSS-REFERENCE TO RELATED PATENT APPLICATION

The present application is a continuation of U.S. application Ser. No. 15/709,131, filed on Sep. 19, 2017, which claims the benefit of and priority to U.S. Provisional Application No. 62/397,247, filed on Sep. 20, 2016, which are incorporated herein by reference in their entireties.

BACKGROUND

The present invention relates generally to the field of tools. The present invention relates specifically to a tool with a ratchet mechanism, such as a ratchet, a combo wrench with ratchet mechanism, socket wrench with ratchet mechanism, screw driver with ratchet mechanism, etc. Ratchet mechanisms are used in a variety of tools that use a twisting or rotating motion of the tool, typically to drive a fastener component (e.g., a nut, a bolt, a screw, etc.), and the ratchet mechanism allows the tool or tool handle to be rotated relative to the fastening component to reset the handle position without driving the fastening component and without requiring the tool to be disengaged from the fastening component.

SUMMARY OF THE INVENTION

One embodiment of the invention relates to a tool. The tool includes a tool body including workpiece engagement surfaces and a ratcheting mechanism coupled to the workpiece engagement structure. The ratcheting mechanism includes a gear structure having a plurality of gear teeth, and a pawl structure having a plurality of pawl teeth engaged with the gear teeth. The pawl structure includes a pawl body integral with the pawl teeth formed from an elastic material that biases the pawl teeth against the gear teeth, that allows the pawl body to flex away from the gear teeth which allows the pawl teeth to rotate past the gear teeth in a first rotational direction, and that allows the pawl teeth to engage the gear teeth such that the pawl teeth are rotationally fixed relative to the gear teeth in a second rotational direction.

In various embodiments, the pawl structure includes at least two arms extending from a pawl body, and each of the pawl arms include at least one pawl tooth. The pawl teeth of the arms are shaped and/or positioned relative to each other such that the maximum distance from a leading surface of one of the pawl teeth to the closest adjacent engagement surface of one of the gear teeth is less than or equal to a gear tooth spacing distance (e.g., an arc length between opposing portions of adjacent gear teeth) divided by the number of pawl arms. In a specific embodiment, the number of pawl arms is two and the maximum distance from a leading surface of one of the pawl teeth to the closest adjacent engagement surface of one of the gear teeth is less than or equal to one half of the gear tooth spacing distance. In a specific embodiment, the number of pawl arms is six and the maximum distance from a leading surface of one of the pawl teeth to the closest adjacent engagement surface of one of the gear teeth is less than or equal to one sixth of the gear tooth spacing distance.

In specific embodiments, the pawl body includes a central trunk coupled at a first end to a base and coupled at a second end to a pair of pawl arms both extending away from the central trunk. In some such embodiments, one of the pawl arms also extends in a clockwise direction, and the other extends in a counterclockwise direction. The pawl teeth are located at the ends of both of the pawl arms opposite of the pawl base. The pawl structure is shaped relative to the gear teeth such that during rotation in the first direction, the pawl teeth of each arm alternate in engagement with the gear teeth.

In specific embodiments, the pawl structure is shaped relative to the gear teeth such that during rotation in the second direction, the pawl teeth of only one of the arms engages with the gear teeth. In specific embodiments, a medial axis of the tool body traverses the pawl structure, and the pawl structure is shaped such that it is non-symmetrical relative to the medial axis of the tool body. In a specific embodiment, a buttress structure formed in the tool body is positioned to engage a surface of the pawl structure during rotation in the second direction, and the buttress structure is located on the opposite side of the medial axis from at least one of the arms of the pawl structure.

In various embodiments, at least one portion of the pawl body is formed from an elastic material biasing the pawl teeth. In specific embodiments, at least one of the central trunk and the pawl arms are formed from the elastic material biasing the pawl teeth. In specific embodiments, the central trunk and the pawl arms formed from a metal material that is contiguous and continuous with the material of the pawl teeth.

In a specific embodiment, the gear teeth extend radially outward and away from the workpiece engagement surfaces, and the pawl teeth extend radially inward toward the gear teeth and the workpiece engagement surfaces. In a specific embodiment, the pawl structure is located between the gear teeth and the tool body. In a specific embodiment, the ratchet mechanism does not include a separate spring element (e.g., a coil spring) that is separate from the pawl body for biasing the pawl teeth.

In other specific embodiments, the pawl structure includes a central body defining an opening, and the workpiece engagement structures are located in the opening. In this embodiment, the pawl teeth extend radially outward and away from the workpiece engagement surfaces, and the gear teeth extend radially inward toward the gear teeth and the workpiece engagement surfaces. In a specific embodiment, the pawl structure includes a plurality of arms extending in the circumferential direction around the pawl body, and the pawl teeth extend radially outward from ends of the arms. In a specific embodiment, a flexible hinge structure couples each pawl arm to the pawl central body. In some such embodiments, the hinge structure is formed from a metal material that is contiguous and continuous with the material of both the pawl arms and the pawl central body.

In a specific embodiment, the gear teeth are located between the pawl structure and the tool body. In a specific embodiment, the gear teeth and/or pawl teeth surround at least 180 degrees of the workpiece engagement surfaces. In a specific embodiment, the gear teeth are evenly spaced and completely surround the work piece engagement surfaces. In a specific embodiment, the pawl structure includes at least three pawl arms such that at least one of the pawl teeth are located within each 120 degree arc around the workpiece engagement surfaces.

Another embodiment relates to a driving tool. The driving tool includes a body, a workpiece engagement surface coupled to the body and a ratchet mechanism supported by the body and coupled to the workpiece engagement surface. The ratchet mechanism includes a gear structure coupled to the workpiece engagement surface, and the gear structure includes a plurality of gear teeth. The ratchet mechanism includes a pawl structure including a pawl body, pawl teeth and a spring joint coupling the pawl teeth to the pawl body. The pawl body, the pawl teeth and the spring joint are all formed from a single integral piece of metal material. An elasticity of the metal material within the spring j oint allows the pawl body to flex away from the gear teeth such that the pawl teeth rotate past the gear teeth when the body is rotated in a first rotational direction. The elasticity of the metal material within the spring joint biases the pawl teeth into engagement with the gear teeth such that the pawl teeth are rotationally fixed relative to the gear teeth in a second rotational direction allowing a torque applied to the body in the second rotational direction to translate through the ratchet mechanism to the workpiece engagement surface.

Another embodiment relates to a driving tool. The driving tool includes a body, a workpiece engagement surface coupled to the body and a ratchet mechanism supported by the body and coupled to the workpiece engagement surface. The ratchet mechanism includes a gear structure coupled to the workpiece engagement surface, and the gear structure includes a plurality of gear teeth. The ratchet mechanism includes a pawl body, a pawl tooth and a spring joint coupling the pawl tooth to the pawl body. The spring joint is located between the pawl body and the pawl tooth in a direction from the body toward the workpiece engagement surface. When the body is rotated in a first rotational direction, the spring joint bends allowing the pawl body to flex away from the gear teeth such that the pawl tooth rotates past the gear teeth. When the body is rotated in a second rotational direction, the spring joint biases the pawl tooth into engagement with the gear teeth such that the pawl tooth is rotationally fixed relative to the gear teeth.

Another embodiment relates to a ratcheting driving tool. The tool includes a body, a workpiece engagement surface coupled to the body and a gear structure coupled to and surrounding the workpiece engagement surface. The gear structure includes a plurality of gear teeth and an angular gear tooth spacing, GTS. The tool includes a pawl body, a plural nnumber of pawl arms coupled to and extending from the pawl body and a pawl tooth extending from each pawl arm toward the gear teeth. The tool includes a maximum backlash distance. A spacing between pawl teeth on adjacent pawl arms relative to the gear teeth is such that the maximum backlash distance, measured in degrees, is less than or equal to GTS divided by n.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

DETAILED DESCRIPTION

Figure 1:
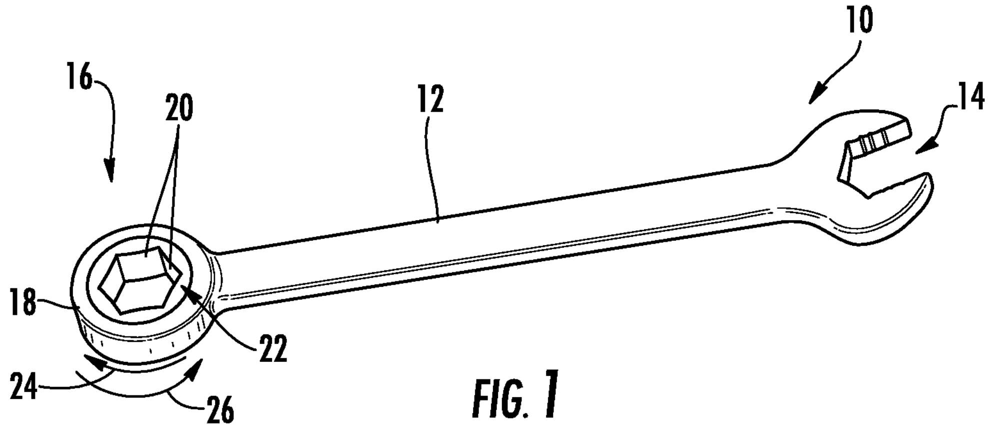
FIG. 1 is a perspective view of a tool including a ratcheting mechanism, according to an exemplary embodiment.

Referring generally to the figures, various embodiments of a ratchet mechanism for a tool are shown and described. In general, ratchet mechanisms are used in a variety of tools that deliver torque to a workpiece such as a component of fastener (e.g., a nut, a bolt, a screw, etc.). In various embodiments, the ratchet mechanisms discussed herein utilize a variety of innovative structures which reduce backlash (e.g., the amount of backward motion permitted before the ratchet mechanism engages stopping rotation of the ratchet). In addition, various embodiments of the ratchet mechanism discussed herein provide a high level of engagement between components of the ratchet mechanism during driving rotation (e.g., restricted rotation in which the ratchet mechanism transfers torque from the tool body/tool handle to the workpiece) such that forces are distributed across multiple engagement surfaces during use. In addition, the components of various embodiments of the ratchet mechanisms are configured relative to the tool body such that the tool body provides a high level of support to the components of the ratchet mechanism during driving. Both the tool body support and the high level of ratchet component engagement are believed to provide a ratchet mechanism with a high level of durability.

In an exemplary embodiment, the ratchet mechanism includes a toothed gear or sprocket and a branched or forked engagement structure, such as a forked pawl structure. The forked pawl includes a pair of arms extending from a central trunk. The arms and/or trunk of the forked pawl act as a spring bending in alternating directions to allow pawl teeth located at the ends of the arms to slide over the teeth of the gear during forward or unrestricted rotation of the ratchet mechanism. In contrast to a typical pawl structure, the spring action of the forked pawl discussed herein maintains a high level of contact between the pawl teeth and the gear teeth, which reduces backlash.

In another exemplary embodiment, the ratchet mechanism includes a toothed ring structure and a generally annular engagement structure or pawl structure located within the toothed ring structure. In this arrangement, the gear includes inward facing teeth, which engage with outward facing teeth of the annular pawl. The annular pawl includes a plurality of engagement arms and plurality of engagement teeth located at the ends of the engagement arms. The engagement arms are shaped in an arc-shape and extend generally in the circumferential direction. Each engagement arm acts as a spring allowing the teeth to slide over the teeth of the gear during forward or unrestricted rotation of the ratchet mechanism. Similar to the prior embodiment, the spring action of the engagement arms discussed herein maintains a high level of contact between the pawl teeth and the gear teeth, which reduces backlash.

In a specific embodiment, the annular pawl structure is formed from multiple layers of similarly shaped annular structures stacked on top of each other. In such embodiments, each layer of the stack is rotationally offset from each other. This rotational offset increases the number of circumferentially spaced pawl surfaces that are available to engage with the gear teeth, which in turn decreases the amount of backlash experienced by the pawl mechanism.

Referring to FIG. 1, a tool, such as wrench 10, is shown according to an exemplary embodiment. In the embodiment shown, wrench 10 is a combination wrench including a tool body 12, an open wrench end 14 and a ratchet head or end 16. Ratchet head 16 is formed from a generally ring shaped portion 18 of tool body 12 that surrounds and supports wrench engagement surfaces 20. As will be understood, in use, wrench engagement surfaces 20 engage a component of a workpiece (e.g., a fastener, a bolt, a nut, etc.), and tool body 12 acts as a handle and a lever to apply torque to the component.

Wrench 10 includes a ratchet mechanism 22 that is supported within a tool body 12, and ratchet mechanism 22 provides ratcheting action to wrench engagement surfaces 20. In general, ratchet mechanism 22 is a mechanical structure that allows for free or unrestricted rotation of tool body 12 around engagement surfaces 20 in a first direction, shown as arrow 24, and allows for restricted or driving rotation of tool body 12 around engagement surfaces 20 in a second direction 26. In general, during rotation in the unrestricted direction 24, ratchet mechanism 22 allows tool body 12 to rotate around engagement surfaces 20 (and around a fastening component located within engagement surfaces 20) without transferring torque to engagement surfaces 20, and during rotation in the restricted direction 26, ratchet mechanism 22 prevents tool body 12 from freely rotating around engagement surfaces 20 (and around a fastening component located within engagement surfaces 20) such that torque applied to tool body 12 is transferred to engagement surfaces 20 and to the fastening component located within engagement surfaces 20.

Figure 2:
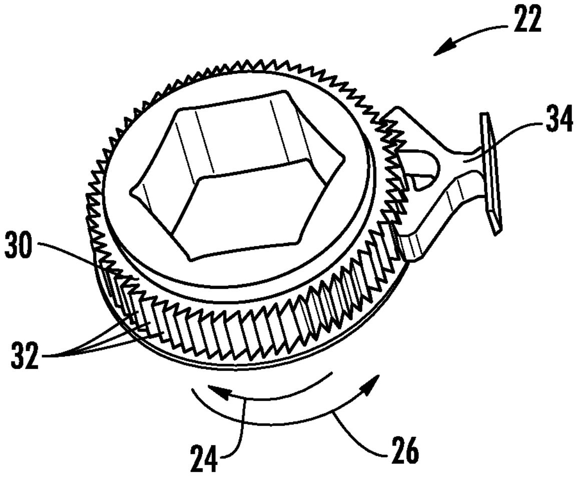
FIG. 2 is a perspective view of a ratchet mechanism of the tool of FIG. 1, according to an exemplary embodiment.
Figure 3:
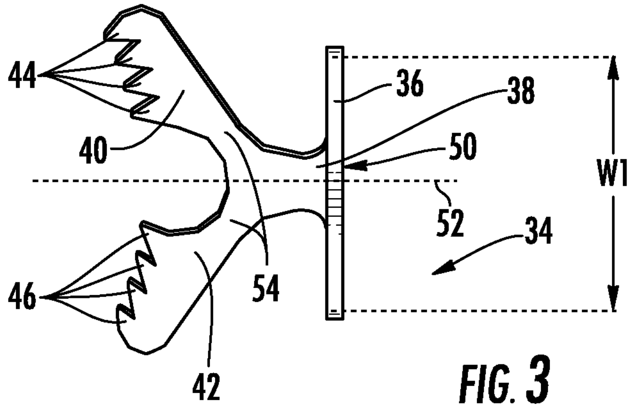
FIG. 3 is a top plan view of a pawl structure of the ratchet mechanism of FIG. 2, according to an exemplary embodiment.
Figure 4:
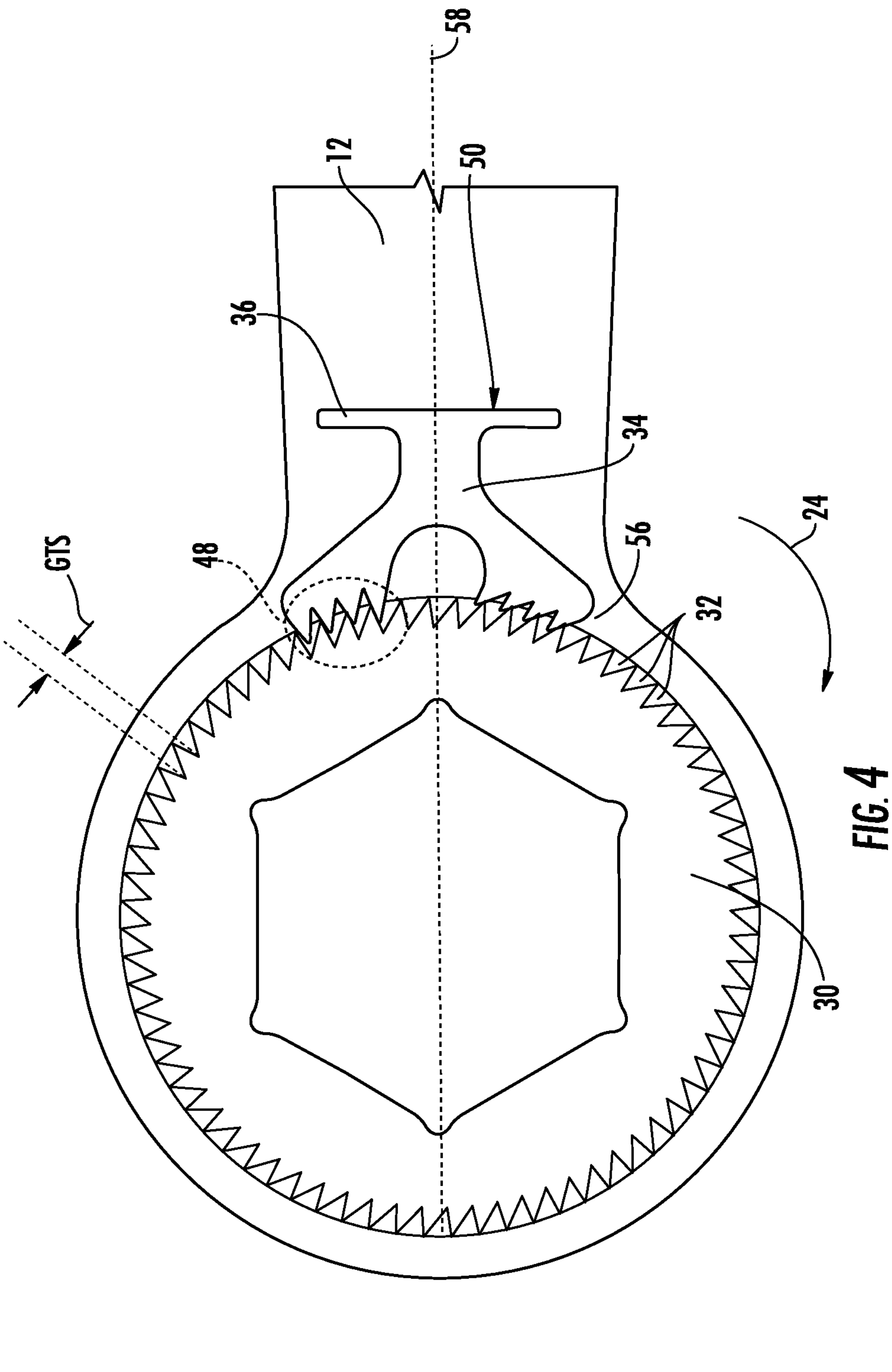
FIG. 4 is a cross-sectional view of the ratcheting tool of FIG. 1 showing the ratcheting mechanism of FIG. 2 mounted within a tool body, according to an exemplary embodiment.

Referring to FIGS. 2-4, components of ratchet mechanism 22 are shown in detail. As shown in FIG. 2, ratchet mechanism 22 includes a sprocket or gear 30. Gear 30 is a generally ring or annularly shaped structure that includes an inner surface that defines an opening in which engagement surfaces 20 are located. The outer surface of gear 30 includes a plurality of teeth 32 which face radially outward from gear 30.

Ratchet mechanism 22 includes a forked or branched engagement structure, shown as a forked pawl 34. Referring to FIG. 3, forked pawl 34 includes a base 36, a central body 38, a first arm 40 and a second arm 42. First arm 40 includes a plurality of teeth 44 located at the end of arm 40 opposite of base 36, and second arm 42 includes a plurality of teeth 46 located at the end of arm 42 opposite of base 36. In general, forked pawl 34 is configured to have both rigidity sufficient to engage and drive engagement surfaces 20 during restricted rotation 26, and elasticity/spring action sufficient to allow the outer surfaces of teeth 44 and 46 to slide over gear teeth 32 during unrestricted/ratchet rotation 24. In contrast to typical pawl structures that utilize a helical coil compression spring to bias the pawl into engagement, forked pawl 34 utilizes the elasticity of the material of body 38 and/or arms 40 and 42 to provide the biasing and flexibility needed to provide the ratcheting movement discussed herein.

Referring to FIGS. 3 and 4, details of the structure and operation of forked pawl 34 are explained in more detail. As tool body 12 is rotated in the direction of arrow 24, clockwise facing surfaces of teeth 44 engage with teeth 32 of gear 30, shown in area 48. Due to the spacing and relative shape of pawl teeth 44 and gear teeth 32, arm 40 and/or central body 38 bends or deflects upon engagement between pawl teeth 44 and gear teeth 32 during rotation in direction 24 which allows pawl teeth 44 to slide over gear teeth 32. Once pawl teeth 44 pass over one of the gear teeth, the elasticity/spring action of arm 40 and/or central body 38 biases pawl teeth 44 into the space located before the next gear tooth 32 as rotation in direction 24 continues. In specific embodiments, the elasticity/spring action of arm 40 and/or central body 38 of pawl 34 is selected to ensure that the amount of force that needs to be applied to the tool handle/body during freewheeling/ratcheting motion is below a threshold, and in particular embodiments, the freewheeling ratcheting threshold is less than 4 lbs., specifically less than 2 lbs., and more specifically is less than 0.5 lbs. In specific embodiments, arms 40 and 42 each include multiple (specifically four) pawl teeth 44 and 46, respectively. In various embodiments, multiple pawl teeth 44 and 46 allow for better/even load distribution across the pawl teeth surfaces during driving engagement (when the tool is rotated in the direction of arrow 26).

Upon continued rotation in direction 24, while pawl teeth 44 are located within the gaps between gear teeth 32, pawl teeth 46 each engage and slide over the adjacent gear tooth 32 in a similar manner. Due to the spacing and relative shape of pawl teeth 46 and gear teeth 32, arm 42 and/or central body 38 bends or deflects upon engagement between pawl teeth 46 and gear teeth 32 during rotation in direction 24. Once pawl teeth 46 pass over the clockwise adjacent gear tooth, the elasticity/spring action of arm 42 and/or central body 38 biases pawl teeth 44 into the space located before the next gear tooth 32, as rotation in direction 24 continues.

In general, forked pawl 34 is shaped and sized such that pawl teeth 44 and 46 are not engaged with gear teeth 32 at the same time. In this arrangement, pawl teeth 44 and 46 alternatingly engage gear teeth 32 generating an alternating pattern of compression and expansion of arms 40 and 42 which moves forked pawl in an alternating or rocking motion during freewheeling rotation similar to an escapement mechanism. Specifically in this arrangement, arm 42 and pawl teeth 46 are spaced and shaped relative to pawl teeth 44 and gear teeth 32 such that pawl teeth 46 are located within gaps between adjacent gear teeth 32 when pawl teeth 44 are sliding over gear teeth 32 and such that pawl teeth 44 are located with gaps between adjacent gear teeth 32 when pawl teeth 46 are sliding over gear teeth 32 during freewheeling rotation.

Similarly, arm 42 and pawl teeth 46 are spaced and shaped relative to pawl teeth 44 and gear teeth 32 such that pawl teeth 46 are located within gaps between adjacent gear teeth 32 when leading surfaces of pawl teeth 44 are engaged with gear teeth 32 during engaged or driving rotation and such that pawl teeth 44 are located with gaps between adjacent gear teeth 32 when pawl teeth 46 are engaged with gear teeth 32 during engaged or driving rotation. Thus in this arrangement, when the user ceases freewheeling motion and rotates tool body 12 in the direction of arrow 26 to engage and drive a workpiece, pawl 34 is shaped such that the pawl teeth of only one of either pawl arm 40 or pawl arm 42 engage with gear teeth 32 during that driving rotation. The engagement of the arm's teeth during any particular driving rotation is based on the positioning of the pawl teeth relative to gear teeth 32 when freewheeling rotation stops such that whichever arm's teeth are closest to the adjacent clockwise facing surfaces of gear teeth 32 will be engaged during driving rotation. In this arrangement, the teeth of the pawl arm that are not engaged are generally located within the gaps between gear teeth 32 such that a space is located between the counterclockwise facing non-engagement pawl tooth surface and the adjacent clockwise facing gear tooth surface, and this results in an arrangement where the non-engaged pawl arm teeth are non-load bearing during that instance of driving rotation.

In addition, forked pawl 34 is shaped and sized to engage with tool body 12 in a manner that provides the support to generate the spring action during unrestricted movement. In such embodiments, base 36 has a surface 50 facing away from, and opposite from, arms 40 and 42 that engages an inner surface of tool body 12. This engagement provides the backstop against which arms 40 and 42 are compressed during ratcheting movement. In specific embodiments, base 36 has a width, W1, that is greater than the width of central body 38, and that is less than the maximum width between the lateral-most portions of arms 40 and 42. This sizing allows for relatively narrow arms 40 and 42 and relatively narrow central body 38 to provide the spring action discussed above, while providing forked pawl 34 with stable base facilitating compression.

In addition, arms 40 and 42 and teeth 44 and 46 are shaped and positioned to provide both the ratcheting movement and the engaged movement of ratchet mechanism 22, discussed herein. In particular, arms 40 and 42 are generally asymmetric about a medial or length axis 52 and form the generally y-shaped structure shown in FIG. 3. Teeth 44 and 46 are each positioned on arms 40 and 42, respectively, such that teeth 44 and 46 are sloped or pointed inward toward length axis 52. As will be discussed in more detail below, the asymmetric shape of arms 40 and 42 allows for the alternating engagement during freewheeling rotation and also ensures that the pawl teeth of only one arm 40 or 42 are engaged at one time during driving rotation. In addition, each arm 40 and 42 includes a thinned or narrowed portion 54 located between teeth 44 and 46 and central body 38. Narrowed portions 54 are thinner than central body 38 which facilitates the flexing and spring action discussed herein. This arrangement the spring joint provided by portions 54 is located between central body 38 and pawl teeth 44 and 46 relative to a direction from the tool body 12 toward the workpiece engagement surface 20. In contrast, typical ratchet mechanisms include a coil spring located between a tool body and a pawl body.

In various embodiments, the pawl mechanisms discussed herein include an n number of at least two pawl arms each bearing one or more pawl teeth, and in these embodiments, the pawl arms and/or pawl teeth on the arms have a spacing relative to each other in a manner that reduces backlash. In various embodiments, the pawl arms and/or pawl teeth on the arms have a spacing relative to each other such that maximum backlash distance (i.e., the maximum distance a leading pawl tooth must travel before engagement with a gear tooth during driving rotation, e.g., in the direction of arrow 26) is less than or equal to the gear tooth spacing, GTS, divided by the n number of at least two pawl arms. As used herein, GTS is the circumferential distance or angular distance between adjacent gear teeth, as shown, for example, in FIG. 6. This structure allows the space between adjacent gear teeth to be evenly divided by the number of pawl arms, which in turn ensures that the pawl teeth on the various arms are evenly distributed across the gaps between adjacent gear teeth, which provides the backlash reduction. As a specific example, the shape and positioning of arms 40 and 42 and/or of pawl teeth 44 and 46 on arms 40 and 42 are such that pawl teeth 44 are offset from pawl teeth 46 in the circumferential direction by distance such that backlash is less than or equal to GTS divided by 2. In one embodiment, GTS is 6 degrees and pawl 34 provides a maximum backlash of about 3 degrees (e.g., 3 degrees plus or minus 10%, 1%, etc.), and in another embodiment, GTS is 5 degrees and pawl 34 provides a maximum backlash of about 2.5 degrees (e.g., 3 degrees plus or minus 10%, 1%, etc.).

As will be understood as discussed above, the backlash provided by ratchet mechanism 22 can be further decreased by increasing the number of arms that pawl 34 includes and/or by decreasing the GTS of gear 30. In one such embodiment, pawl 34 has four arms, and is formed from a stacked structure having two layers and each of the layers has two arms. In this arrangement, the teeth of each one of the four arms are positioned relative to each other (e.g., via a circumferential offset) such that the maximum backlash provided by the ratchet mechanism is GTS divided by 4. In other embodiments, pawl 34 may have 3, 4, 5, or more stacked layers each having two arms such that backlash is further decreased.

Further, tool body 12 includes a buttress structure 56 located adjacent to arm 42. In the orientation of FIG. 4, buttress structure 56 is located clockwise from arm 42. When tool body 12 is rotated counterclockwise (e.g., to engage the ratchet mechanism to drive a fastener), an outer, clockwise facing portion of the outer surface of arm 42 engages a counterclockwise facing surface of buttress structure 56. Through this engagement, ratchet mechanism 22 is supported via tool body 12 during engagement with a workpiece such as a fastener.

Referring to FIG. 4, tool body 12 defines a lengthwise or medial axis 58. In general, pawl mechanism 34 is positioned within tool body 12 such that medial axis 58 traverses, and more specifically bisects, base surface 50 of pawl mechanism 34. In a specific embodiment, and in contrast to many compression spring based pawl mechanisms, pawl 34 is shaped such that one arm (e.g., arm 40) is located on one side of axis 58, and the other arm (e.g., arm 42) is located on the other side of axis 58. In addition, pawl 34 is shaped such that one arm, arm 40, is located on one side of axis 58, and buttress structure 56 is located on the other side of axis 58. Applicant believes that this arrangement allows for both the use of the generally y-shaped pawl discussed herein while providing the tool body support of buttress structure 56 while also facilitating a satisfactory level of force distribution around gear 30 during driving rotation.

Referring to FIGS. 5-10, a ratchet mechanism 60 is shown according to another embodiment. Similar to ratchet mechanism 22, ratchet mechanism 60 is supported within tool body 12 and provides both restricted movement for driving a workpiece (e.g., a fastener) and unrestricted/ratcheting movement as discussed above. In addition, similar to ratchet mechanism 22, ratchet mechanism 60 includes a pawl arrangement having flexible elastic arms that provide spring action to the pawl rather than including a separate spring member that engages and biases the pawl.

Figure 5:
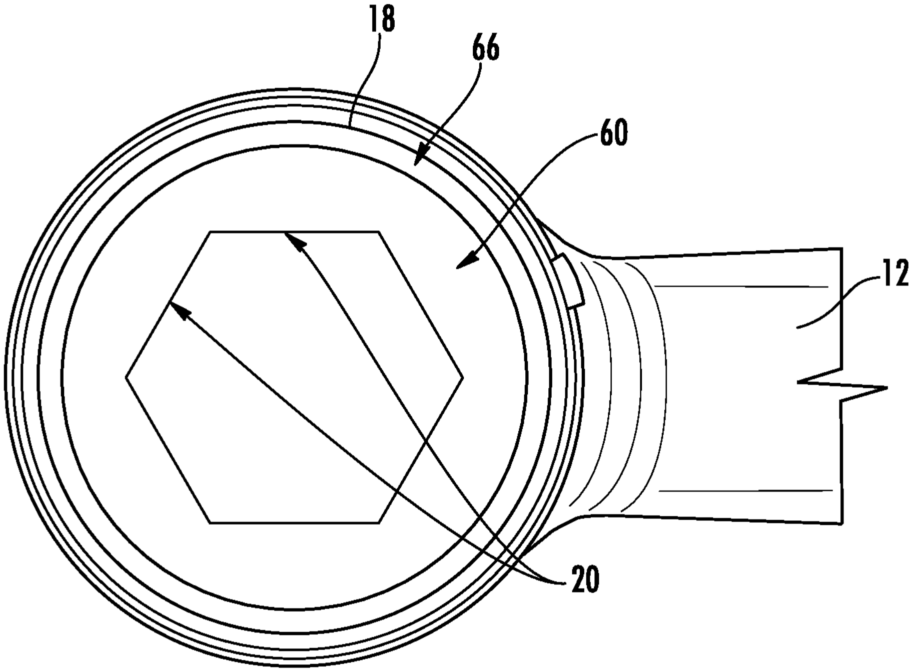
FIG. 5 is a top plan view showing a ratcheting mechanism mounted within a tool body, according to another exemplary embodiment.
Figure 6:
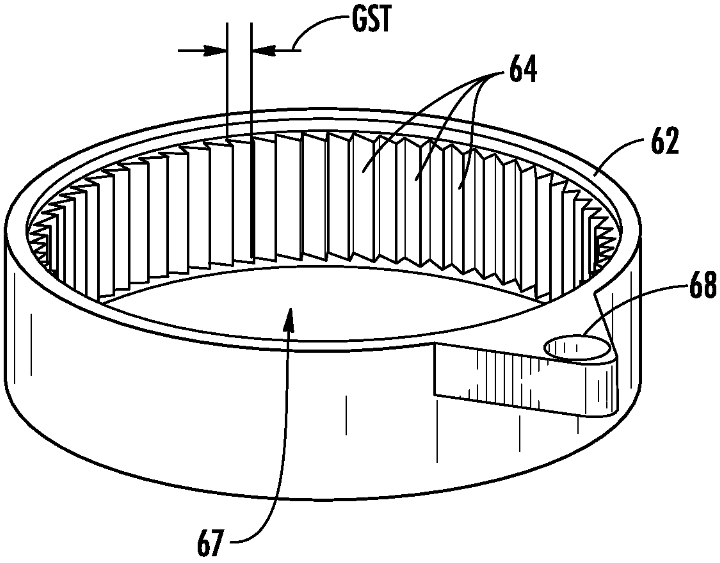
FIG. 6 is a gear structure of the ratcheting mechanism of FIG. 5, according to an exemplary embodiment.

Referring to FIG. 6, ratchet mechanism 60 includes a gear structure 62. As shown in FIG. 6, gear structure 62 is a ring or annular shaped structure that includes an inner surface defining a plurality of radially inwardly extending gear teeth 64 that extend around a central open area 67. In this arrangement, ratchet mechanism 60 and fastener engagement surfaces 20 shown in FIG. 5 are located within and are surrounded by gear structure 62. In this arrangement, gear structure 62 is supported by ring-shaped head portion 18 and is located within gap 66 shown in FIG. 5. As will be generally understood, the teeth of a pawl structure of ratchet mechanism 60 freely rotate relative to gear teeth 64 in one direction providing for ratcheting movement, and the teeth of a pawl structure of ratchet mechanism 60 engage with gear teeth 64 in the opposite direction providing for engaged or driving movement.

In general, gear structure 62 includes one or more connector for rigidly coupling gear structure 62 to tool body 12. As shown in FIG. 6, gear structure 62 includes a projecting arm 68. Projecting arm 68 extends radially outward from an outer surface of gear structure 62. In general, projecting arm 68 engages a cooperating recess or surface within tool body 12 such that gear structure 62 is rigidly fixed relative to tool body 12 such that rotation of gear structure 62 relative to tool body 12 is substantially prevented. This engagement between gear structure 62 and tool body 12 allows for both driving/engaged rotation and ratcheting rotation. In the specific embodiment shown, projecting arm 68 is a generally triangular shaped structure that engages a generally triangular shaped recess within tool body 12. In another embodiment, as shown for example in FIG. 10, gear teeth 64 may be formed directly on tool body 12 surrounding the pawl structure of ratchet mechanism 60.

Figure 7:
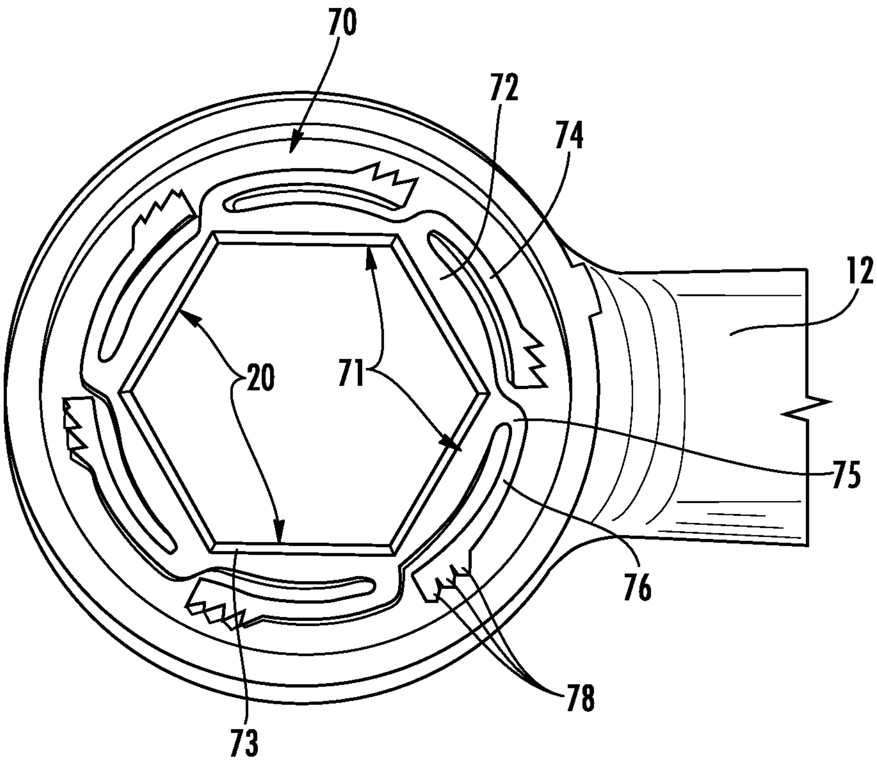
FIG. 7 is a top plan view of a pawl structure of the ratcheting mechanism of FIG. 5 located within a tool body, according to an exemplary embodiment.
Figure 8:
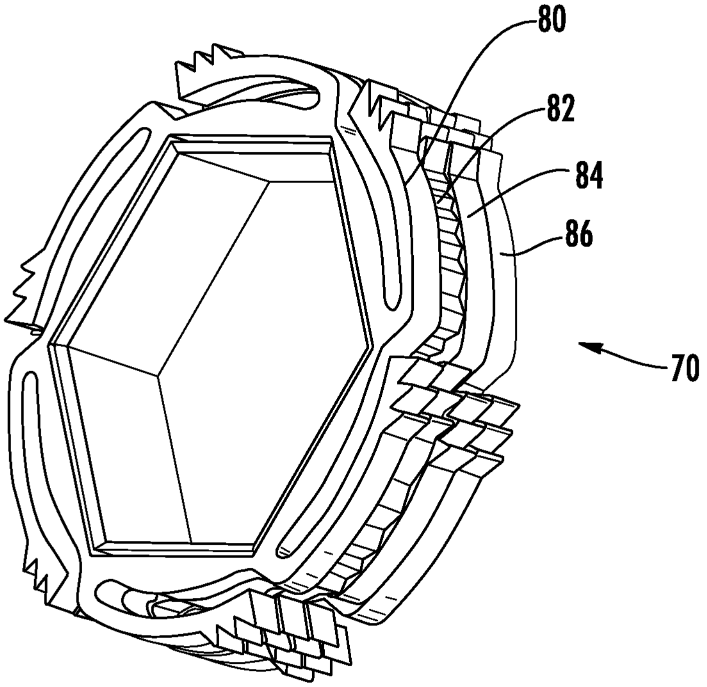
FIG. 8 is a perspective view of the pawl structure of FIG. 7, according to an exemplary embodiment.
Figure 9:
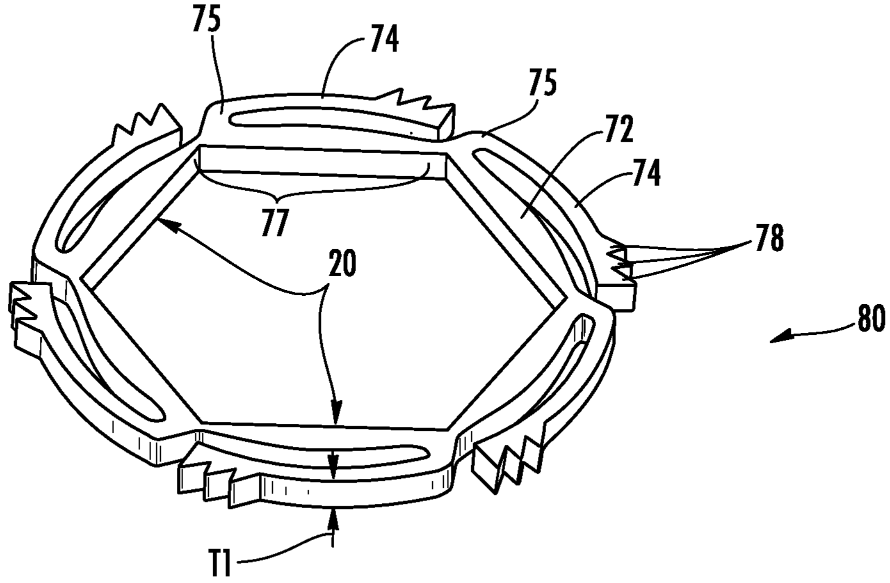
FIG. 9 is a perspective view of a pawl unit, according to an exemplary embodiment.

Referring to FIGS. 7-9, pawl structure 70 of ratchet mechanism 60 is shown and described in more detail. Pawl structure 70 includes a generally ring-shaped body 72 defining faceted (e.g., hexagonal) inner surface 71. A hexagonal collar 73 is located within and surrounded by pawl structure 70, and as shown in FIG. 7, hexagonal collar 73 defines fastener engagement surfaces 20. In addition, collar 73 alone or combined with an outer surrounding collar, acts to hold the components of pawl structure 70 together and in proper alignment within tool body. It should be understood that collar 73 may form other shapes as may be needed to engage other, non-hexagonally shaped fasteners.

Pawl structure 70 includes plurality of arms 74 extending radially outward from body 72. Each arm 74 includes a flexible arm segment 76 and a plurality of pawl teeth 78 located at the outer end (e.g., distal from the connection between body 72 and arm 74) of each arm 74. A flexible spring hinge or joint 75 joins each arm 74 to pawl body 72 and is located between a radially outer section of pawl body 72 and flexible arm segment 76. In this arrangement, spring joint 75 is in the form of a living hinge formed from material that is contiguous and continuous with both body 72 and arm 74. In general, each arm segment 76 and/or spring hinge 75 provides flexibility sufficient for the ratcheting movement and rigidity sufficient for the driving movement as discussed herein. In specific embodiments, the elasticity/spring action of arm segment 76 and/or spring hinge 75 of pawl 70 is selected to ensure that the amount of force that needs to be applied to the tool handle/body during freewheeling/ratcheting motion is below a threshold, and in particular embodiments, the freewheeling ratcheting threshold is less than 4 lbs., specifically less than 2 lbs., and more specifically is less than 0.5 lbs. Similar to the spring joint provided by portions 54 as discussed above, spring joint 75 is located between pawl body 72 and pawl teeth 78 relative to a direction from the tool body 12 toward the workpiece engagement surface 20.

In various embodiments, pawl structure 70 includes at least three arms 74. In the specific embodiment shown, pawl structure 70 includes six arms 74, and each arm includes three pawl teeth 78. However, in other embodiments, pawl structure 70 includes more or less than six arms 74 and/or more or less than three pawl teeth 78 per arm.

As shown in the embodiment of FIG. 8, pawl structure 70 is formed from a stack of pawl units 80, 82, 84 and 86. In this embodiment, each pawl unit 80, 82, 84 and 86 have the same shape and arrangement as each other. Pawl units 80, 82, 84 and 86 are arranged in a stack forming pawl structure 70, as shown in FIG. 8. In some embodiments, pawl structure 70 includes two pawl units, three pawl units or more than four pawl units. It should be understood that in other embodiments, pawl structure 70 may be formed from a single, unitary piece of material that provides the functionality discussed herein.

As shown in FIG. 9, each of the pawl units 80, 82, 84 and 86 (pawl unit 80 is shown as an example) are shown and described in more detail. In specific embodiments, pawl unit 80 includes one pawl arm 74 for each side of engagement surface 20, and in the specific embodiment shown, pawl unit 80 surrounds a hexagonally shaped, six-sided engagement surface 20 and therefore includes six pawl arms 74. In addition, pawl arms 74 are positioned relative to engagement surfaces 20 to provide strength and load distribution during driving rotation. In specific embodiments, joints 75 are positioned adjacent to engagement surface vertices 77 which Applicant believes provides for a desirable level of load distribution. In specific embodiments, joint 75 of each arm 74 is coupled to body 72 within plus or minus 20 degrees, specifically plus or minus 10 degrees, and more specifically plus or minus 5 degrees of each vertex 77. In specific embodiments, arms 74 and teeth 78 are sized and shaped such that the outer most tooth (e.g., the tooth at the end of each arm opposite from joint 75) is located adjacent to the vertex 77 and to joint 75 of the clockwise vertex or joint (in the orientation of FIG. 9), and in specific embodiments, arm 74 is shaped/sized such that the outer most one of teeth 78 of each arm 74 is 72 within plus or minus 20 degrees, specifically plus or minus 10 degrees, and more specifically plus or minus 5 degrees of the adjacent, clockwise vertex 77. In various embodiments, pawl unit 80 has a thickness, T1, that is selected to provide the pawl unit with a high enough strength and consistent and predictable level of compression and deformation during freewheeling and driving rotation.

Figure 10:
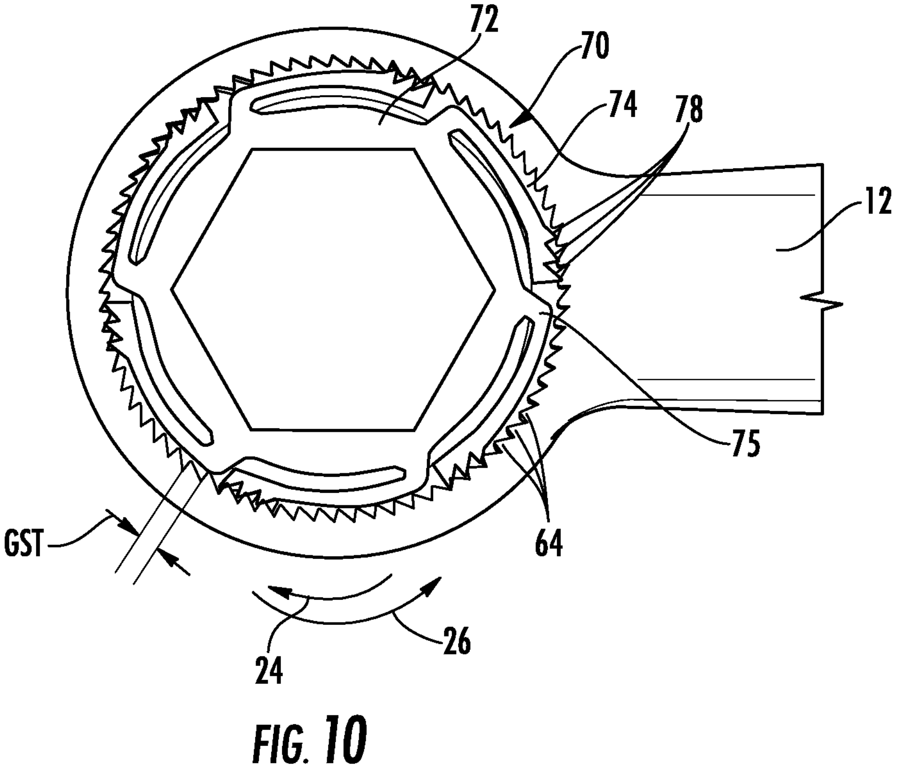
FIG. 10 is a cross-sectional view of the ratcheting tool of FIG. 5 showing the ratcheting mechanism mounted within a tool body, according to an exemplary embodiment.

Referring to FIG. 10, operation of ratchet mechanism 60 is explained in more detail. Similar to ratchet mechanism 22, ratchet mechanism 60 is a mechanical structure that allows for free or unrestricted rotation of tool body 12 around engagement surfaces 20 in a first direction, shown as arrow 24, and allows for restricted or driving rotation of tool body 12 around engagement surfaces 20 in a second direction 26. When tool body 12 is rotated in the direction of arrow 24, pawl teeth 78 slide over the counterclockwise facing surface of each gear teeth 64, and the flexibility provided by arms 74 generally, and by flexible joint 75 specifically, allows for arms 74 to deflect inwardly as pawl teeth 78 crest the radially innermost points of pawl teeth 78.

When tool body 12 is rotated in the direction of arrow 26, the spring action flexibility provided by arms 74 generally, and by flexible joint 75 specifically, bias pawl teeth 78 into the space between adjacent gear teeth 64. Further rotation engages clockwise facing surfaces of gear teeth 64 against counterclockwise facing surfaces of pawl teeth 78. As will generally be understood, the relative shape and positioning of pawl teeth 78, gear teeth 64 and arms 74 result in locking of pawl teeth 78 against gear teeth 64 (e.g., pawl teeth 78 are not permitted to slide over gear teeth 64) upon rotation in the direction of arrow 26. This locking of pawl teeth 78 against gear teeth 64 allows for transfer of torque from handle 12 through ratchet mechanism 60, engagement surfaces 20 to the workpiece (e.g., fastener) being driven by tool 10. In the embodiment shown, multiple pawl teeth 78 at various circumferential positions around pawl structure 70 engage with gear teeth 64 upon driving rotation. This allows for forces during engaged/driving rotation to be more evenly distributed around ratchet mechanism 60 as compared to typical pawl structures.

Further, even force distribution is provided by a ratchet mechanism structure that distributes gear teeth 64 and/or pawl teeth 78 around fastener engagement surfaces 20. In a specific embodiment, gear teeth 64 and/or pawl teeth 78 surround at least 180 degrees of the fastener engagement surfaces 20. In a specific embodiment, gear teeth 64 are evenly spaced and completely surround the fastener engagement surfaces 20. In addition, pawl teeth 78 are also positioned in evenly spaced groups surrounding fastener engagement surfaces 20.

Figure 11:
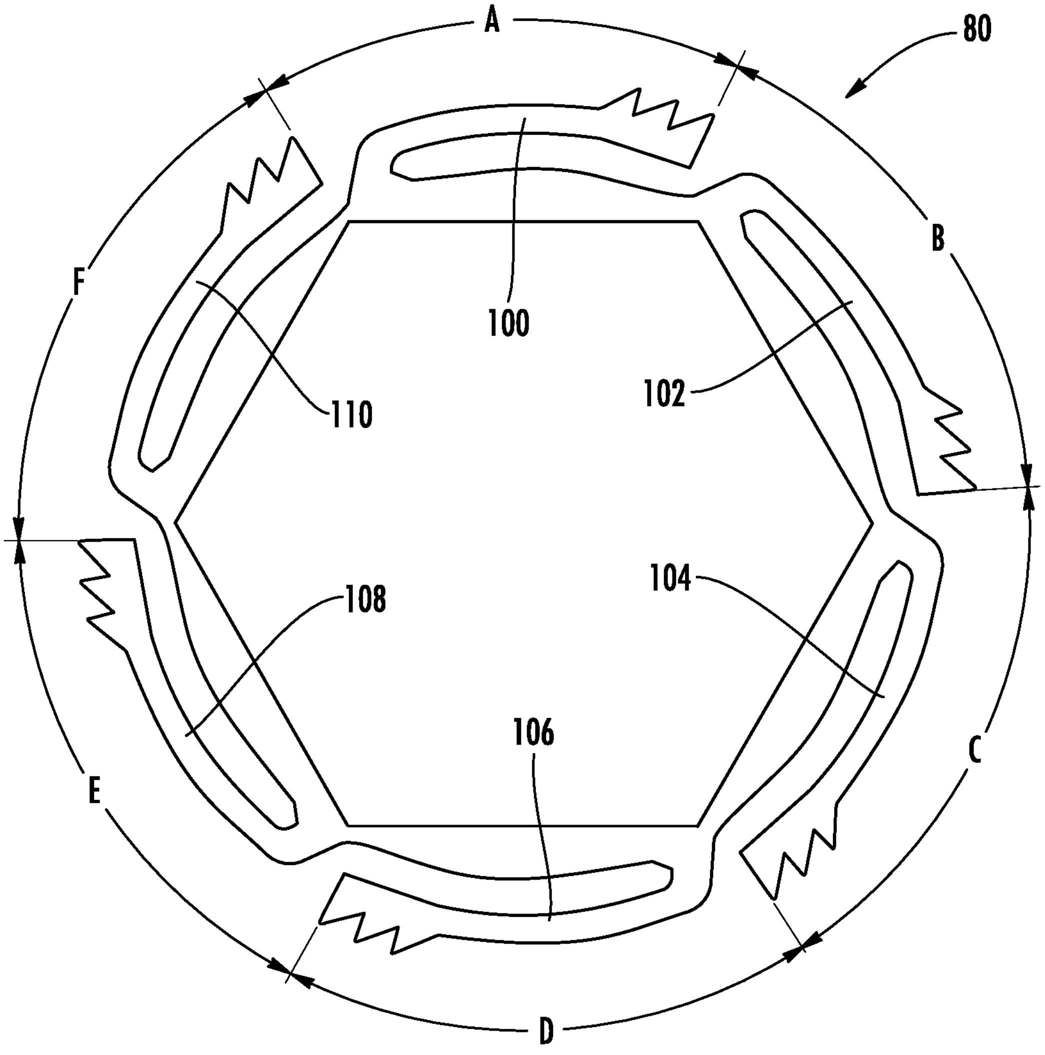
FIG. 11 is a top plan view of a pawl unit of the pawl structure of FIG. 7, according to an exemplary embodiment.
Figure 12:
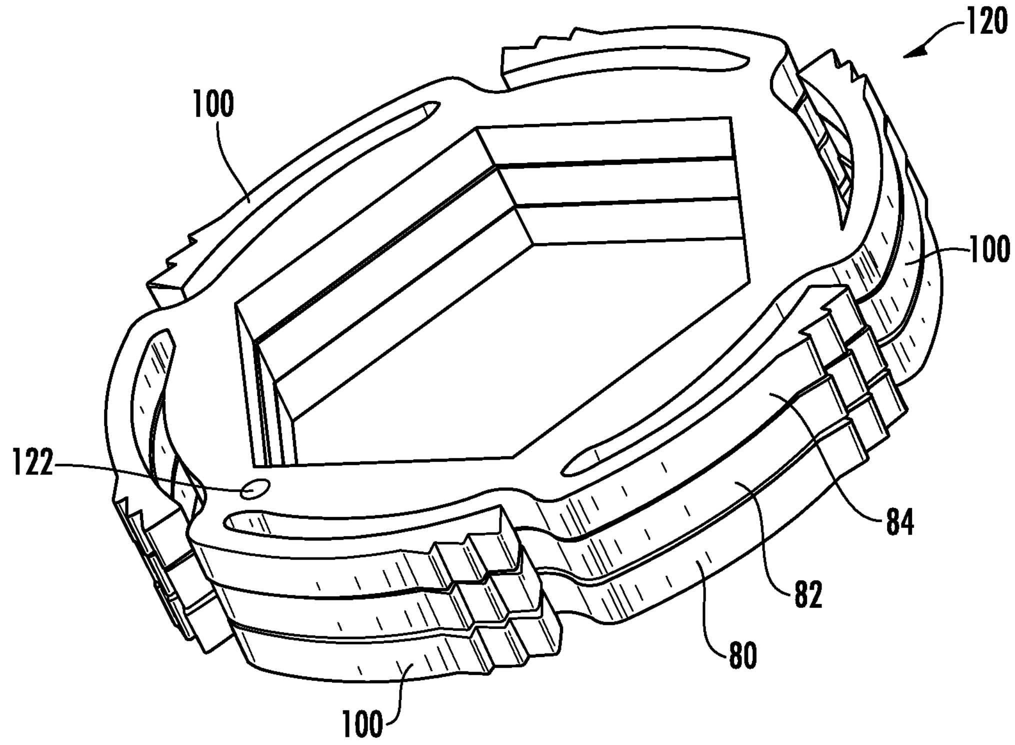
FIG. 12 is a perspective view of a pawl structure from below, according to another exemplary embodiment.

Referring to FIGS. 11 and 12, pawl unit 80 and a stack 120 of three pawl units, 80, 82 and 84, are shown and described to illustrate various aspects of the ratchet design Applicant has determined facilitate backlash decrease and even load distribution. It should be understood that stack 120 is substantially the same as pawl stack 70 discussed above except it has three pawl units instead of four.

In general, as noted above, the pawl mechanisms discussed herein are sized and shaped to decrease or minimize the distance that must be traveled for the pawl teeth to engage the gear teeth upon rotation of the tool body in the driving direction. Referring to FIG. 11, in one embodiment, this backlash limitation is provided by slightly offsetting each of the arms 74 of pawl 80 from each other in a sequential manner around the perimeter of pawl 80. This additional offset spacing in effect divides the gear tooth spacing by the number of arms which ensures that the maximum distance that a pawl unit must be rotated in the driving direction before one of the pawl teeth engages a gear tooth is less than GST. As a contrasting example, if arms 74 were evenly spaced around pawl 80, the maximum distance that pawl unit could be rotated in the driving direction before a pawl tooth engages a gear tooth would be the same as the GST (see FIG. 6 and FIG. 10) of gear 62. In specific embodiments, this offsetting distance between adjacent arm pairs is equal to GST divided by the number of pawl arms that the pawl unit has (6 in the case of pawl unit 80).

Referring specifically to FIG. 11, each pawl arm 74 has an angular position relative to the counterclockwise adjacent arm, starting at the 12 o'clock position, shown as angles A, B, C, D, E and F. In general, one of the arms 74 can be identified as a first position arm 100 and is defined by an angle A relative to the counterclockwise adjacent arm (arm 110 in FIG. 11). Second position arm 102 is positioned at an angle B from arm 100, and angle B=A+GST/6. Third position arm 104 is positioned at an angle C from arm 102, and angle C=B+GST/6. Fourth position arm 106 is positioned at an angle D from arm 104, and angle D=C+GST/6. Fifth position arm 108 is positioned at an angle E from arm 106, and angle E=D+GST/6. Sixth position arm 110 is positioned at an angle F from arm 108, and angle F=E+GST/6.

Thus, given a six armed pawl mechanism, this spacing ensures that the pawl teeth of one of the arms is no more than GST divided by 6 away from engagement with the next closest gear tooth 64 when the tool handle is rotated in the driving direction, and thus, this reduces the maximum amount of backlash to GST divided 6. In various embodiments, the offset distance, represented in the 6 arm embodiment as GST/6 is less than 1.5 degrees, specifically is less than 1 degree and more specifically is between 0.5 degrees and 0.9 degrees. In specific embodiments, gear 62 includes 72 teeth, and in such embodiments, GST is 5 degrees, and GST/6 is 0.8333 degrees. In other embodiments, pawl unit 80 may include more or less than six arms, such as two arms, three arms, four arms, five arms, eight arms, etc.

Referring to FIG. 12, a stack 120 of three pawl units 80, 82 and 84 is shown according to an exemplary embodiment. In this embodiment, pawl units 80, 82 and 84 all have the same configuration as each other, and in the stacked arrangement, each pawl unit is rotationally offset from the adjacent units in the stack. In general, this rotational offset ensures that the pawl arms with a given position (e.g., pawl arm 100 at angle A) are evenly distributed around the circumference of stack 120. As will be understood, given a particular position of pawl stack 120 relative to gear teeth 64, one of the arms 100, 102, 104, 106, 108 and 110 will be a leading arm (i.e., the pawl arm closest to engagement with a gear tooth when rotation in the driving direction begins, which can be any one of the pawl arms depending on the position when freewheeling motion is stopped) due to the offset position of that arm. By distributing the leading arm around the circumference of stack 120, the pawl teeth that engage with gear teeth 64 upon engagement when the tool body is rotated in the driving direction is also evenly distributed around stack 120 and gear 62. Applicant believes this force/load distribution limits the risk of wear, breakage, etc. by distributing the load during fastener driving.

Referring specifically to FIG. 12, the rotational position between pawl units 80, 82 and 84 is shown in more detail. As shown, each of pawl units 80, 82 and 84 are rotationally offset from each other by 120 degrees, such that each of the distinctly positioned pawl arms are offset from the corresponding arm in the adjacent unit in the stack by 120 degrees. Thus, as show in FIG. 12 as an example, pawl arms 100 (shown at the 12 o'clock position in the orientation of FIG. 11) of each pawl unit 80, 82 and 84 are spaced at 120 degrees from each other in the circumferential direction. As will be understood the rotational offset between pawl units within the stack is based on the number of units in the stack as determined by the equation 360 degrees divided by the number of pawl units in the stack. For example, the four pawl unit stack 70 shown in FIG. 8 has a 90 degree rotational offset between adjacent units in the stack.

Figure 13:
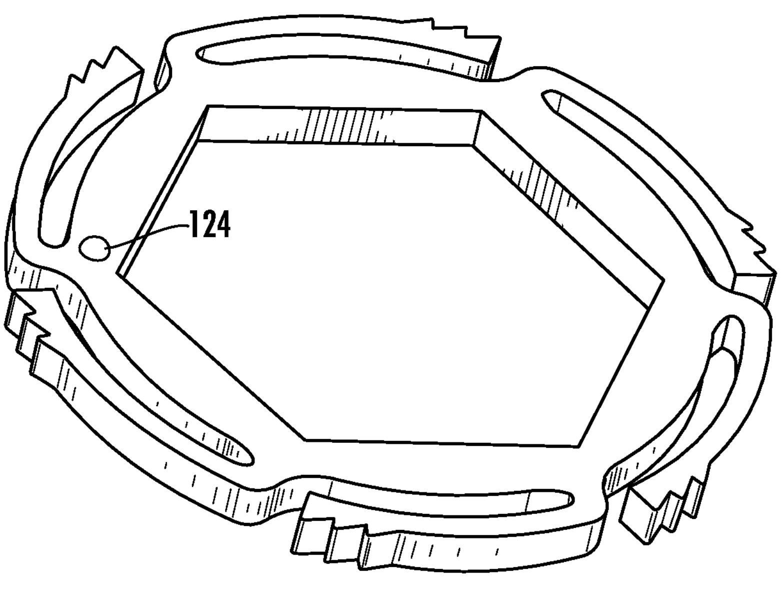
FIG. 13 is a perspective view of a pawl unit of the pawl structure of FIG. 12, according to an exemplary embodiment.

Referring to FIGS. 12 and 13, in various embodiments, pawl units include an alignment feature to facilitate alignment of the pawl units in a manner that generates the rotational offset discussed above. In one embodiment, each pawl unit includes a recess 122 on one major surface and a projection 124 on the opposite major surface. The recess 122 and projection 124 are positioned such that as pawl units are stacked, recess 122 of one pawl unit receives the projection 124 of the adjacent pawl unit such that the desired rotational offset position is achieved, as discussed above.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A driving tool comprising:

a body;

a workpiece engagement surface coupled to the body;

a ratchet mechanism supported by the body and coupled to the workpiece engagement surface, the ratchet mechanism comprising:

a gear structure coupled to the workpiece engagement surface, the gear structure comprising a plurality of gear teeth; and a pawl structure comprising pawl units, each pawl unit comprising a pawl body, pawl teeth and a spring joint coupling the pawl teeth to the pawl body, wherein the pawl body, the pawl teeth and the spring joint are all formed from a single integral piece of metal material;

wherein the workpiece engagement surface faces radially inward away from the pawl teeth;

wherein an elasticity of the metal material within the spring joint allows the spring joint to bend such that the pawl teeth rotate past the gear teeth when the body is rotated in a first rotational direction;

wherein the elasticity of the metal material within the spring joint biases the pawl teeth into engagement with the gear teeth such that the pawl teeth are rotationally fixed relative to the gear teeth in a second rotational direction allowing a torque applied to the body in the second rotational direction to translate through the ratchet mechanism to the workpiece engagement surface; and wherein the pawl units are stacked on top of each other and wherein the pawl teeth of adjacent pawl units are offset from each other in a circumferential direction.

2. The driving tool of claim 1, wherein the ratchet mechanism does not include a spring element non-integral with the pawl body for biasing the pawl teeth.

3. The driving tool of claim 1, wherein the pawl teeth are located inside of the gear teeth in a radial direction such that the gear teeth are located between the pawl teeth and the body in the radial direction, and the pawl teeth are located between the workpiece engagement surface and the gear teeth in the radial direction.

4. The driving tool of claim 3, wherein the pawl teeth surround at least 180 degrees of a circumference of the workpiece engagement surface and the pawl teeth point radially outward away from the workpiece engagement surface.

5. The driving tool of claim 3, wherein the pawl body is a ring that completely surrounds a circumference of the workpiece engagement surface, wherein the pawl structure further comprises at least two pawl arms extending radially outward from the pawl body and a plurality of spring joints, wherein one of the spring joints is located between each pawl arm and the pawl body, wherein at least one pawl tooth is located on each pawl arm.

6. The driving tool of claim 5, wherein a number of pawl arms is at least three, and at least one pawl tooth is located within each adjacent 120 degree arc around the circumference of the workpiece engagement surface.

7. A driving tool comprising:

a body;

a workpiece engagement surface coupled to the body; and a ratchet mechanism supported by the body and coupled to the workpiece engagement surface, the ratchet mechanism comprising:

a gear structure coupled to the workpiece engagement surface, the gear structure comprising a plurality of gear teeth;

pawl units, each pawl unit comprising:

a pawl body;

a pawl tooth; and a spring joint coupling the pawl tooth to the pawl body, wherein the spring joint is located between the pawl body and the pawl tooth in a direction from the body toward the workpiece engagement surface;

wherein the workpiece engagement surface faces radially inward away from the pawl tooth;

wherein, when the body is rotated in a first rotational direction, the spring joint bends such that the pawl tooth rotates past the gear teeth;

wherein, when the body is rotated in a second rotational direction, the spring joint biases the pawl tooth into engagement with the gear teeth such that the pawl tooth is rotationally fixed relative to the gear teeth; and wherein the pawl units are in a stacked arrangement, and wherein adjacent pawl units in the stacked arrangement are angularly offset from each other.

8. The driving tool of claim 7, wherein the pawl body, the pawl tooth and the spring joint are all formed from a single integral piece of metal material.

9. The driving tool of claim 7, wherein the ratchet mechanism further comprises:

at least two pawl arms extending from the pawl body;

a plurality of spring joints, one of the spring joints located between each pawl arm and the pawl body; and a plurality of pawl teeth, wherein at least one pawl tooth is located on each pawl arm.

10. The driving tool of claim 9, wherein the pawl teeth are spaced relative to the gear teeth such that a maximum angular distance between a leading surface of any of the pawl teeth and the engagement surface of an adjacent gear tooth is less than or equal to the angular distance between engagement surfaces of adjacent gear teeth, GTS, divided by a number of pawl arms.

11. The driving tool of claim 7, wherein the pawl body is a ring completely surrounding the workpiece engagement surface, wherein the gear teeth point radially inward relative to the body and the pawl tooth points radially outward relative to the body.

12. The driving tool of claim 11, wherein the ratchet mechanism further comprises at least two pawl arms extending radially outward from the pawl body and a plurality of spring joints, wherein one spring joint is located between each pawl arm and the pawl body, wherein at least one pawl tooth is located on each pawl arm.

13. A ratcheting driving tool comprising:

a body;

a workpiece engagement surface coupled to the body;

a gear structure coupled to and surrounding the workpiece engagement surface, the gear structure comprising a plurality of gear teeth and an angular gear tooth spacing, GTS;

a pawl structure comprising a stack of pawl units, each pawl unit comprising:

a pawl body;

a plural n number of pawl arms coupled to and extending from the pawl body;

a plurality of pawl teeth extending from each pawl arm toward the gear teeth;

a spring joint located between each pawl arm and the pawl body, wherein an elasticity of a material within the spring joints allows the pawl arms to flex away from the gear teeth such that the pawl teeth rotate past the gear teeth when the body is rotated in a first rotational direction; and a maximum backlash distance, wherein a spacing between pawl teeth on adjacent pawl arms relative to the gear teeth is such that the maximum backlash distance, measured in degrees, is less than or equal to GTS divided by n;

wherein the pawl arms of adjacent pawl units are angularly offset from each other around a perimeter of the pawl structure.

14. The ratcheting driving tool of claim 13, wherein the pawl body, the pawl teeth and the pawl arms are all formed from a single integral piece of metal material.

15. The ratcheting driving tool of claim 14, further comprising wherein the spring joints are also formed from the single integral piece of metal material as the pawl body, the pawl teeth and the pawl arms, wherein the elasticity of the metal material within the spring joints biases the pawl arms such that pawl teeth engage the gear teeth such that the pawl teeth are rotationally fixed relative to the gear teeth in a second rotational direction allowing a torque applied to the body in the second rotational direction to translate to the workpiece engagement surface.

16. The driving tool of claim 1, wherein the spring joint extends from a radially outward facing surface of the pawl body.

17. The ratcheting driving tool of claim 13, wherein the pawl arms extend radially outward from and along the pawl body.

18. The ratcheting driving tool of claim 13, wherein an inward facing surface of the pawl arms faces a radially outward facing surface of the pawl body.

19. The driving tool of claim 7, wherein each pawl unit further comprises at least two pawl arms extending from the pawl body, wherein the at least two pawl arms of each pawl unit are angularly offset from the at least two pawl arms of adjacent pawl units.

20. The ratcheting driving tool of claim 13, wherein the pawl arms of each pawl unit are spaced at 120 degrees from corresponding pawl arms of adjacent pawl units in a circumferential direction.

* * * * *